US005971000A

United States Patent
Koncsek et al.

[11] Patent Number: 5,971,000
[45] Date of Patent: Oct. 26, 1999

[54] INTERNAL COMPRESSION SUPERSONIC ENGINE INLET

[75] Inventors: Joseph L. Koncsek; Kenneth J. Marrs, both of Seattle, Wash.

[73] Assignee: The Boeing Company, Seattle, Wash.

[21] Appl. No.: 09/139,813

[22] Filed: Aug. 25, 1998

Related U.S. Application Data

[62] Division of application No. 08/623,484, Mar. 28, 1996, Pat. No. 5,881,758.

[51] Int. Cl.⁶ .................................................. B64D 33/02
[52] U.S. Cl. ............................................ 137/14; 137/15.2
[58] Field of Search ........................... 137/14, 15.1, 15.2

[56] References Cited

U.S. PATENT DOCUMENTS

| | | |
|---|---|---|
| 2,989,846 | 6/1961 | Hausammann . |
| 3,032,977 | 5/1962 | Neitzel . |
| 3,430,640 | 3/1969 | Lennard . |
| 3,450,141 | 6/1969 | Braendlein . |
| 3,643,676 | 2/1972 | Limage et al. . |
| 3,645,676 | 2/1972 | Cochran . |
| 3,941,336 | 3/1976 | Nangia ............................. 137/15.1 X |
| 4,307,743 | 12/1981 | Dunn . |
| 4,641,578 | 2/1987 | Haas et al. ............................. 137/15.1 |
| 4,991,795 | 2/1991 | Koncsek . |
| 5,033,693 | 7/1991 | Livingston et al. . |
| 5,078,341 | 1/1992 | Bichler et al. . |

*Primary Examiner*—Gerald A. Michalsky
*Attorney, Agent, or Firm*—Christensen, O'Connor, Johnson & Kindness PLLC

[57] ABSTRACT

An internal compression engine inlet (39) including a flexible external cowl with leading edge cowl lips (72); a duct comprising a supersonic diffuser (44) defined by upper and lower forward ramps (50), (52), a subsonic diffuser (46) defined by upper and lower aft ramps (54), (56), and a throat region (48); a first slot (58) formed between adjacent ends of the upper forward and upper aft ramps; and a second slot (60) formed between adjacent ends of the lower forward and lower aft ramps, is provided. Each slot (58), (60) opens to a plenum (120), (122) having a vent door (126) covering a vent (124) that opens to a low pressure volume. Further inlet components include an optional splitter (62) for creating additional airflow compression, a precision vent (128) for expelling small amounts of plenum air, and a control system (150) for varying the cross-sectional area of the duct and the position of the vent doors in order to create an aerodynamically efficient airflow passage within the duct for any particular flight condition. Further provided is a method of providing air to an aircraft engine using an internal compression engine inlet including: sensing current flight conditions; configuring the inlet components to their optimal positions for the current flight conditions; channeling air into a duct having a supersonic diffuser region followed by a throat region having first and second slots each slot opening into a plenum, the throat region being followed by a subsonic diffuser; sensing the static air pressure in the supersonic diffuser; sensing the static air pressure within each plenum; comparing the supersonic diffuser static air pressure with the plenum air pressures; and selectively exhausting air from each plenum to maintain the static air pressure in the plenums at a desired amount.

7 Claims, 6 Drawing Sheets

INTERNAL COMPRESSION SUPERSONIC ENGINE INLET

This application is a divisional of U.S. application Ser. No. 08/623,484, filed on Mar. 28, 1996, now U.S. Pat. No. 5,881,758.

FIELD OF THE INVENTION

The present invention relates to aircraft engine inlets, and more particularly to variable capture internal compression engine inlets of supersonic aircraft.

BACKGROUND OF THE INVENTION

When an engine inlet is accepting the full volume of airflow passing through the projection of its intake aperture, the engine inlet is said to be operating in "full" mode. If for some reason, such as the inability of the engine to pass the full airflow or other restriction, the engine inlet cannot accept the full volume of the approaching airstream, the excess air is spilled around the external cowl, and the aircraft engine inlet is said to be operating in "spill" mode.

In general, subsonic aircraft engine inlets operate efficiently in spill mode during all phases of flight. Only small amounts of drag are incurred if cowls with blunt leading edges and streamlined external surfaces are used. For known supersonic aircraft, engine inlets operate in full mode during supersonic cruise flight and spill mode during subsonic flight. Supersonic engine inlets, however, are optimized for cruise conditions, where relatively sharp forward cowl edges and slender external cowl surfaces effectively reduce drag during full mode operation. Unfortunately, this optimum supersonic inlet shape is nearly the opposite of the optimum subsonic shape. The supersonic inlet design spills air inefficiently in the sub- and transonic flight segments (i.e., those flight segments prior to and after the supersonic flight segments) and causes the aircraft to incur high spillage drag. The result of this engine inlet flow spillage is an increase in the overall aircraft aerodynamic drag, which ultimately reduces the net thrust of the propulsion system.

Flow spillage around the supersonic engine inlet could be avoided by using an internal compression type of supersonic inlet, provided such an inlet were equipped with a variable capture area. In spite of their aerodynamic appeal, these inlets have not been proposed for practical application because of the difficulty in recovering from an abnormal operating mode called "unstart" during supersonic flight. Unstarts are described below.

As background information, supersonic airplanes can move faster than the local speed of sound (Mach 1) relative to the ambient air. Gas turbine engines propelling such airplanes work efficiently only if the approaching airflow is moving at subsonic speeds (generally less than Mach 0.6). It is the function of the shape of the engine inlet to reduce the speed of the intake airstream from supersonic to midrange subsonic Mach numbers. Therefore, the inlet must first slow the intake air stream to a near sonic speed (near Mach 1), then slow the airstream again to the desired subsonic speed. A supersonic inlet therefore comprises two distinct regions: a supersonic compression region and a subsonic compression region.

Various types of engine inlets are available and are defined by the amount of exposure the supersonic compression region bears relative to the external environment. At least three types of engine inlets are currently available: internal compression, mixed compression, and external compression. The present invention is concerned only with the internal compression type engine inlet, where supersonic compression occurs entirely within the interior of the engine inlet duct.

It is a physical characteristic of a gas, such as air, that in order to compress a supersonic stream (i.e., to reduce its Mach number) the inlet duct cross-sectional area must contract, but to continue the compression from Mach 1 to a lower Mach number, the cross-sectional area must expand. Therefore, all internal compression supersonic inlets have a convergent-divergent duct cross-sectional area distribution. The convergent duct area, termed the supersonic diffuser, defines the supersonic compression region. The divergent duct area, termed the subsonic diffuser, defines the subsonic compression region.

A cross-sectional side view of a prior art internal compression inlet 20 is illustrated in FIG. 1. The inlet 20 of FIG. 1 consists of a circular cowl and duct. The information presented with regard to the prior art is also relevant with regard to prior art rectangular inlet ducts. The internal compression inlet 20 includes an engine cowl 22 having a cowl lip 24 at its leading edge, and a duct defined by interior surfaces of the engine cowl. The duct includes three general regions: a supersonic diffuser 28 having convergent opposing walls; a subsonic diffuser 30 having divergent opposing walls and lying aft of the supersonic diffuser 28; and a small throat region 32 connecting the two diffusers and having generally parallel opposing walls. The throat region 32 is the area of the duct which is most narrow.

Still referring to FIG. 1, the aircraft on which the inlet 20 is mounted, normally travels at supersonic speeds. Free stream air (represented by arrow 34) external to the inlet is traveling at supersonic speeds relative to the inlet 20. The free stream air is captured and initially slowed from a first supersonic speed to a second supersonic speed within the supersonic diffuser 28. Various oblique shock waves are generated, represented by broken lines 36. The oblique shock waves 36 represent the dramatic transition of supersonic airflow to a slower supersonic speed. The airflow transitions from supersonic to subsonic speed across a normal shock wave 38 located in the forward area of the subsonic diffuser 30, just aft of the most narrow portion of the throat 32. The captured air is further slowed to lower subsonic speeds in the subsonic diffuser 30.

It is physically impossible for any normal shock wave to persist in the converging supersonic diffuser 28 of an internal compression engine inlet duct. If a flow disturbance causes the normal shock to move forward into a converging cross section, ahead of the throat, the flow becomes unstable, and the normal shock wave will be violently expelled out the front of the inlet until it takes up a position forward of the engine inlet aperture, at the cowl lip. This expulsion of the normal shock is commonly termed an "unstart" and is accompanied by abrupt large amplitude changes in the aerodynamic forces acting on the inlet. Flow disturbances leading to inlet unstarts have a number of natural causes, such as thermal updrafts or jet streams in the atmosphere. They may also be induced by aircraft maneuvers, or by changes in the airflow demand of the engine.

When an internal compression inlet unstarts, the thrust produced by the engine is significantly decreased, and at the same time, the drag caused by the inlet is significantly increased. The simultaneous decrease in thrust and increase in drag have a drastic effect on the aircraft's flight characteristics. If the aircraft is traveling at very high speeds when unstart occurs, the aircraft will rapidly decelerate, making control of the aircraft by the pilot difficult or impossible for a period of time. Unless the inlet is quickly "restarted" to move the normal shock from at, or forward of, the cowl lip back into the throat, the pilot will not be able to continue supersonic flight.

Normal operation is restored through the "restart" sequence. At each flight Mach number there is a maximum ratio of the aperture area (A) to the throat area (A*), above which restart is not possible. This well-known starting contraction ratio (A/A*) is much less than what is required for efficient supersonic aircraft performance. Nonetheless, if an unstart occurs, the ratio must be decreased to at least the maximum starting contraction ratio. Restart of an internal compression inlet is difficult because the inlet aperture area includes all of the engine's intake capture area such that a very large increase in the throat area is necessary to reach the starting contraction ratio.

Attempts to solve the problem of unstarts and restarts for internal compression inlets have been unsuccessful. U.S. Pat. No. 4,991,795 describes a configuration that has addressed the problem for mixed compression inlets. The device of the '795 patent includes a cowl, a forward ramp, an aft ramp, multiple actuators for selective movement of the ramps, and a slot between the forward and aft ramps. The slot is positioned at the inlet throat and opens into a plenum having a vent through which air may be expelled. A control system receives input from pressure sensors at various locations in the inlet and causes the position of a vent door to open or close, thereby controlling the pressure within the duct in order to control the position of the normal shock wave. Although the technique disclosed in U.S. Pat. No. 4,991,795 is intended for use with a mixed compression inlet, the technique is incorporated herein by reference, to the extent consistent with this disclosure.

Thus a need exists for an internal compression engine inlet that avoids spill mode and its associated spillage drag, deters unstarts from occurring, and allows quick restarts during supersonic flight should an unstart occur.

SUMMARY OF THE INVENTION

The present invention provides an internal compression engine inlet including: a flexible external cowl with leading edge cowl lips; a duct having a supersonic diffuser, a subsonic diffuser, and a throat region connecting the supersonic and subsonic diffusers; upper and lower forward ramps defining the supersonic diffuser; upper and lower aft ramps defining the subsonic diffuser; a first slot formed between adjacent ends of the upper forward and upper aft ramps; and a second slot formed between adjacent ends of the lower forward and lower aft ramps.

The inlet preferably is a rectangular inlet further including opposed stationary vertical sidewalls forming the upright sides of the duct. In addition, an optional splitter is available for creating additional airflow compression, the splitter being located in the duct at mid-height between the first and second slots, with the splitter's longitudinal axis coextensive with the inlet longitudinal axis. The splitter is carried by the stationary sidewalls.

In accordance with further aspects of the invention, the inlet includes a control system for sensing inlet conditions, flight conditions, and aircraft performance, including air pressures at different locations within the inlet duct. The control system computes output position commands to various inlet components to adjust their positions in order to create the most aerodynamically efficient cross-sectional duct area for a particular flight condition. The control system includes a predefined logic and an optional display unit.

The forward and aft ramps each include leading ends and trailing ends. The forward ramp leading edges are rigidly attached to the flexible cowl lips. The aft ramp trailing ends are rotatably attached to downstream duct walls. The inlet includes an intake aperture defined by the distance between the cowl lips. The aperture corresponds to the maximum cross-sectional area of the free stream air which the inlet may capture during supersonic flight.

The forward and aft ramps are movable to a variety of positions and angles relative to the longitudinal axis of the inlet, using one of a number of known methods. In a preferred embodiment, the forward ramps each have a slightly concave portion and a linear portion. One end of each concave portion is joined to a cowl lip and the other end is rotatably joined to an end of the linear portion. Mechanical actuators are linked to the forward and aft ramps in order to adjust their shapes and orientations. Alternatively, other configurations of forward and aft ramps may be used, as well as other methods of moving the ramps within the duct. The different ramp positions allow the inlet to vary the cross-sectional area of the throat region in order to produce the most efficient duct shape. The different ramp positions also allow for increased or decreased curvature in the forward ramps in order to enhance compression in the supersonic diffuser and in order to change the bluntness of the cowl lips in order to reduce flow spillage drag. The position of the ramp actuators is controlled according to the output commands of the control system.

In accordance with other aspects of the present invention, the first and second slots open to upper and lower shock trap plenums, respectively. Each plenum has a vent that opens to a low pressure volume and a vent door for controlling the size of the vent opening. Each vent door is controllable via a door actuator. Both plenums optionally include a precision vent for expelling precise small quantities of air from the plenum. The amount of expulsion of air from the plenums is controlled by the control system. The different available ramp positions and the ability to siphon airflow via the plenums, are used to avoid unstarts in the first instance and to quickly restart the inlet should an unstart nevertheless occur during supersonic flight.

In accordance with further aspects of the invention, a method of providing air to an aircraft engine using an internal compression engine inlet includes: sensing current flight conditions; configuring the inlet components to their optimal positions for the current flight conditions; channeling air into a duct having a supersonic diffuser region followed by a throat region having first and second slots each opening into a plenum, the throat region being followed by a subsonic diffuser; sensing the static air pressure in the supersonic diffuser; sensing the static air pressure within each plenum; comparing the supersonic diffuser static air pressure with the plenum air pressures; and selectively exhausting air from each plenum to maintain the static air pressure in the plenums at a desired level. During normal supersonic flight this level is approximately equal to the static air pressure in the supersonic diffuser.

In accordance with other aspects of the invention, the method further includes varying the cross-sectional area of the duct at various locations to provide efficient intake of air into the engine during all flight conditions. In particular, the method includes: varying the duct cross-sectional area for optimal subsonic flight, transonic flight, off-design (started) flight, design flight, and design flight during flow disturbances; exhausting air from the plenums to start the internal compression engine inlet; exhausting air from the plenums during started flight when the static air pressure in the plenums becomes larger than the static air pressure in the supersonic diffuser; and exhausting air from the plenums during started flight should the air pressure in the subsonic diffuser increase undesirably.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Although the detailed description of the present invention is presented below with reference to a rectangular engine inlet, it is to be understood that circular engine inlets may benefit from use of the present invention. Therefore, even though the present invention was developed for, and is described herein relative to, a rectangular engine inlet, the present invention encompasses use in other engine inlet applications where appropriate. It should also be kept in mind that the following description refers to a rectangular engine having vertical side walls. The inlet may be so installed, or it may be re-oriented 90 degrees about the longitudinal axis of the engine such that the ramps become vertical and the sidewalls are horizontal.

Figure 1:
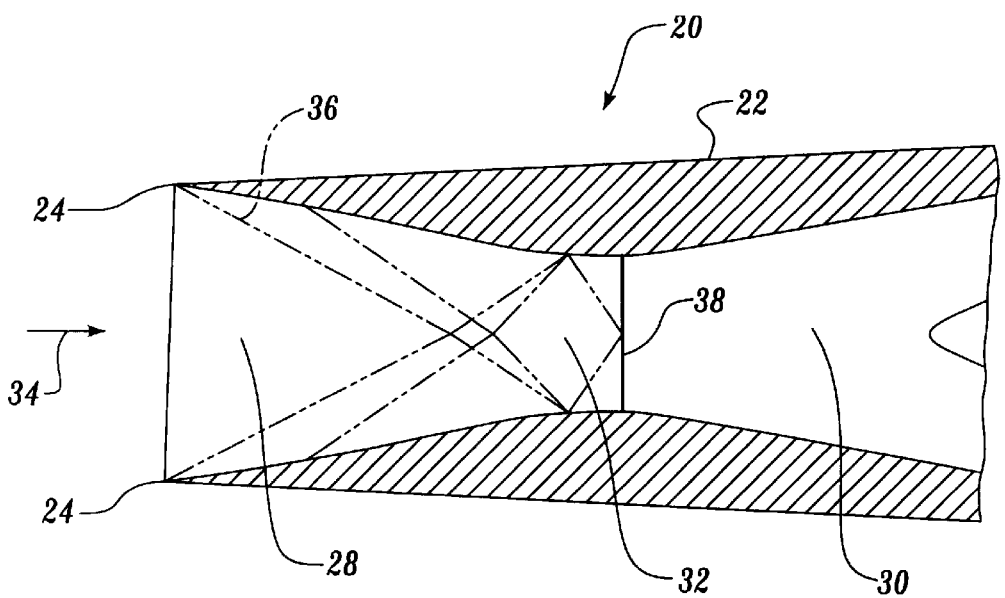
FIG. 1 is a schematic vertical axial section of a conventional internal compression engine inlet.
Figure 2:
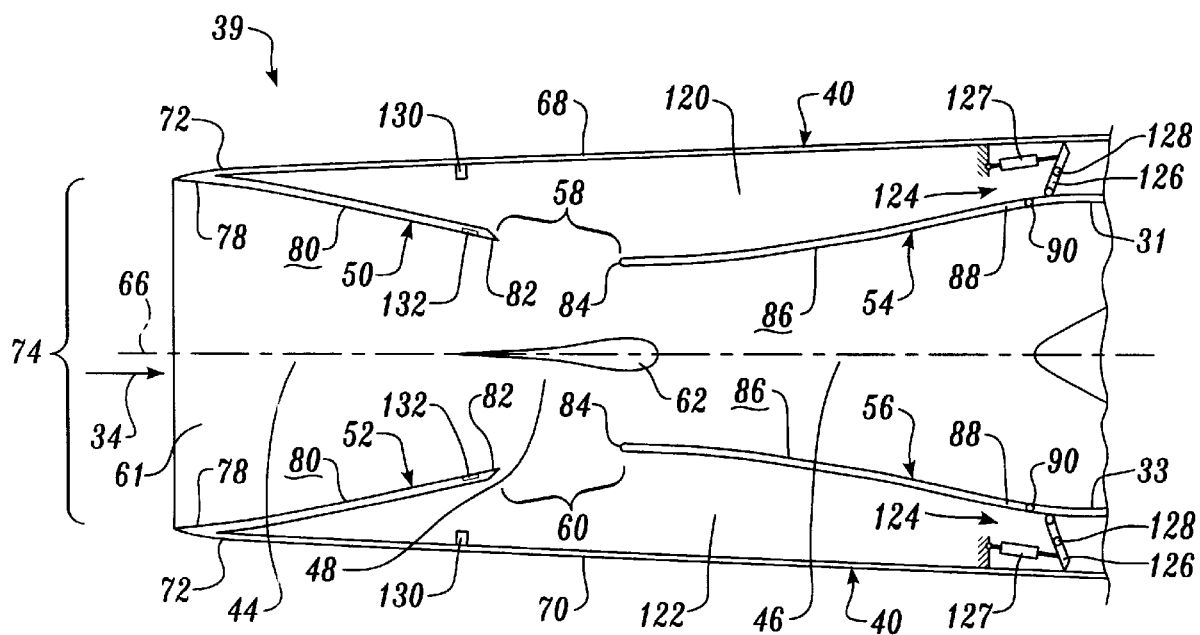
FIG. 2 is a schematic vertical axial section of an internal compression engine inlet in accordance with the present invention.

The internal compression engine inlet 39 incorporating features of the present invention shown in FIG. 2 includes: a flexible external cowl 40; a duct having three main regions, a supersonic diffuser 44 at the forward end of the inlet, a subsonic diffuser 46 at the aft end of the inlet, and an intermediately located throat region 48 connecting the supersonic and subsonic diffusers; upper and lower forward ramps 50 and 52 defining the top and bottom of the supersonic diffuser 44; upper and lower aft ramps 54 and 56 defining the top and bottom of the subsonic diffuser 46; an upper slot 58 in the throat, formed by the space between adjacent ends of the upper forward and upper aft ramps 50, 54; and a lower slot 60 in the throat, formed by the space between adjacent ends of the lower forward and lower aft ramps 52, 56. The inlet 39 also includes opposed stationary sidewalls 61 extending vertically between top and bottom flexible external cowl surfaces 68, 70. The sidewalls 61 form the upright sides of the duct. The far sidewall is shown in FIGS. 2–10. An optional splitter 62 can be provided in the throat region 48 to create additional airflow compression. The splitter 62 is centered vertically between the first and second slots 58 and 60, with the splitter's longitudinal axis generally coextensive with the inlet longitudinal axis 66.

Figure 11:
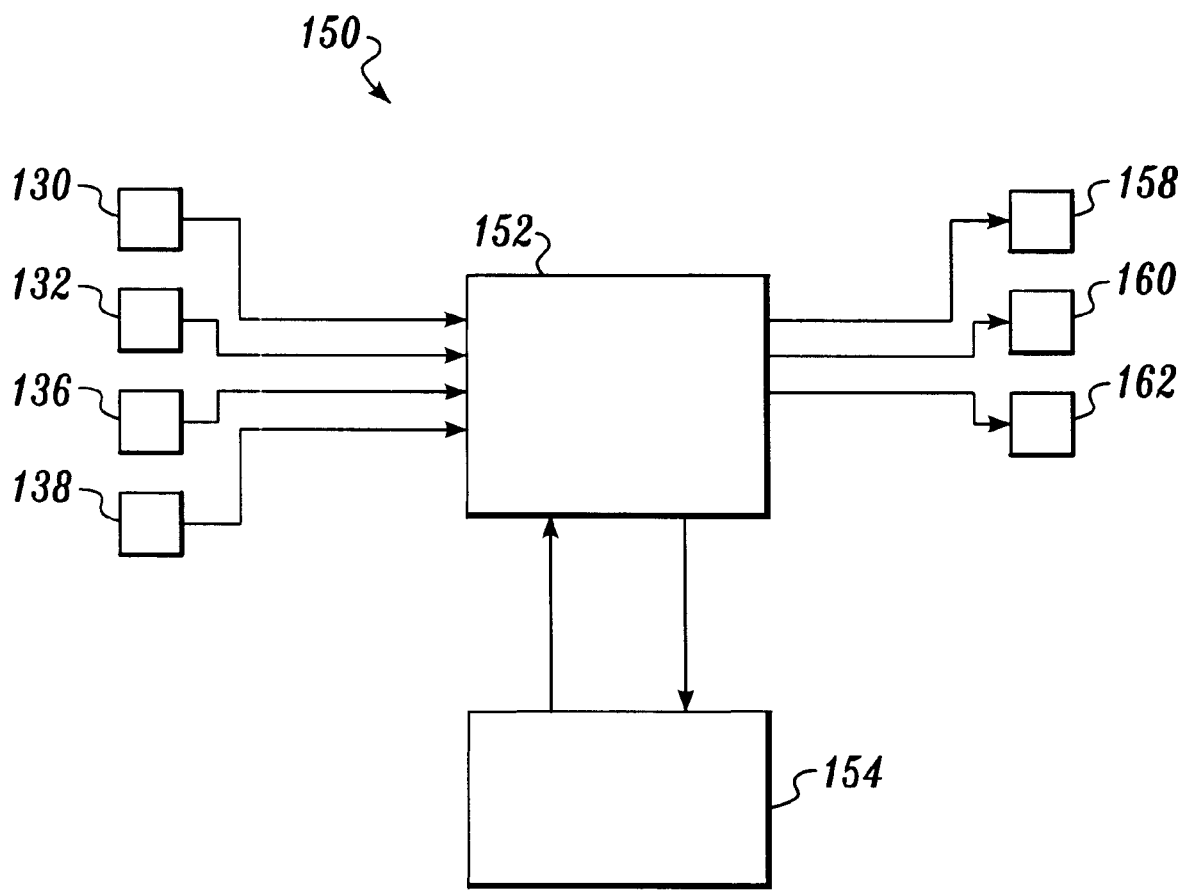
FIG. 11 is a schematic view of an exemplary embodiment of an inlet control system in accordance with the present invention.

The inlet 39 further includes a central control system 150 as shown in FIG. 11. Inputs to the control system are collected by sensors that continuously measure aircraft performance and duct airflow conditions. Specific inputs may include signals from forward ramp static pressure sensors 132, plenum static pressure sensors 130, and vent door actuators 127. Outputs of the system include control signals to actuators that control the positions of the inlet components. The control system 150 and actuators are discussed in detail below.

The cowl 40 is basically an external flexible metal covering for the inlet and the engine. The cowl 40 is secured to the engine and/or wing using conventional methods. The cowl may be a curved cowl for use with a cylindrical engine intake, or a horizontal cowl for use with a rectangular engine intake. Use of an external cowl making a very small angle with the direction of flight is generally preferred since a shallow angle cowl minimizes cowl drag and provides more aerodynamically efficient operations. The cowl 40 of FIGS. 2–10 includes an upper protective portion 68 and a lower protective portion 70. Each portion has a cowl lip 72 at its forwardmost edge. The inlet 39 has an intake aperture 74 defined by the area encompassed by the cowl lips and the most forward portions of the sidewalls 61. The intake aperture 74 corresponds to the maximum cross-sectional area of the free stream air which the inlet 39 may capture when flying supersonically.

The inlet duct extends from the inlet aperture 74 to the engine face. The supersonic diffuser 44 is located at the forward end of the duct and is defined by the area between the upper and lower forward ramps 50, 52 and the vertical sidewalls 61. The supersonic diffuser 44 is characterized by the ability to assume a cross-sectional shape that converges in the direction of airflow 34 during supersonic flight. Convergence causes the supersonic airflow to slow to a lower supersonic speed, thus minimizing energy losses at the normal shock wave. The duct subsonic diffuser 46 is located aft of the supersonic diffuser 44, and is defined by the area between the upper and lower aft ramps and the vertical sidewalls. The subsonic diffuser 46 is characterized by the ability to assume a cross-sectional shape that diverges in the direction of airflow 34 during supersonic flight. Divergence causes the subsonic air to slow to a lower subsonic speed.

As shown in FIG. 2, the throat region 48 is the region of potentially minimum duct cross-sectional area that connects the supersonic and subsonic diffusers 44, 46. Technically, the location of absolute minimum physical cross-sectional area is termed the geometric throat. The location of minimum aerodynamic cross-sectional flow is termed the aerodynamic throat. The throat region 48, as the term is used in regard to the present invention, is defined to lie generally between the forward and aft ramps 50, 52, 54, 56, though overlapping a small length of the forward ends of the aft ramps 54, 56. The throat region 48 includes the first and second slots 58, 60, as they may form a "virtual" throat due to manipulation of air pressures and ramp orientations, as described in detail below. Therefore, as used herein, the throat region 48 comprises those areas of the duct within which a normal shock wave may be desirably located.

Referring to FIG. 2, the upper and lower forward ramps 50, 52 each include a leading edge 78, an interior ramp face 80, and a trailing edge 82. The leading edge 78 of the upper forward ramp 50 is attached to the cowl lip of the upper protective portion 68. The leading edge 78 of the lower forward ramp 52 is attached to the cowl lip of the lower protective portion 70. The forward ramp interior faces 80 are generally smooth to enhance the flow of air in the supersonic diffuser 44 of the duct. The forward ramps 50, 52 may be formed of a material flexible enough to bend using suitable known methods, yet strong enough to withstand the pressures of the incoming airflow. A preferred material is the flexible ramp skin described in U.S. Pat. No. 5,033,693, incorporated herein by reference.

Still referring to FIG. 2, the upper and lower aft ramps 54, 56 each include a leading end 84, an interior ramp face 86, and a trailing end 88. Within the duct, the upper aft ramp 54 is located between the first slot 58 and the engine face, and the lower aft ramp 56 is located between the second slot 60 and the engine face. The aft ramp trailing ends 88 are connected to top and bottom downstream duct sidewalls 31, 33 via hinged connections 90. The aft ramp faces 86 are preferably smooth to enhance subsonic airflow. A slight convex curvature may be given to the aft ramps 54, 56 in appropriate cases, as are known to those skilled in the art. The aft ramps 54, 56 may be formed of materials commonly used for supersonic propulsion compounds. Preferred materials are modern composites in order to reduce weight. Although the aft ramps and sidewalls form a rectangular cross section at the throat, the subsonic diffuser transitions to fully circular at the engine face. The aft ramp hinge lines may be located as shown in FIG. 2, or at some other place near the station shown.

The forward and aft ramps 50, 52, 54, 56 are movable to different positions and angles relative to the longitudinal axis of the inlet, using any one of a number of known mechanisms and methods. For example, the ramps may include a single-piece, flexible ramp portion to provide isentropic compression of the air over a range of Mach numbers, as described in U.S. Pat. No. 3,450,141, to Braendlein, incorporated herein by reference. The ramps may be hinged at multiple locations to provide a desired ramp shape as described in U.S. Pat. No. 4,307,743, to Dunn, incorporated herein by reference. Alternatively, either forward or aft ramps may be moved by a mechanical linkage system or otherwise, as shown in U.S. Pat. No. 4,991,795, to Koncsek, incorporated herein by reference.

The specific mechanisms used are not critical to the present invention and therefore are represented diagrammatically in selected drawings discussed below. What is important to the present invention is that the mechanisms provide, preferably, four distinct inlet operating configurations, plus the ability to transition smoothly between each configuration.

Figure 3:
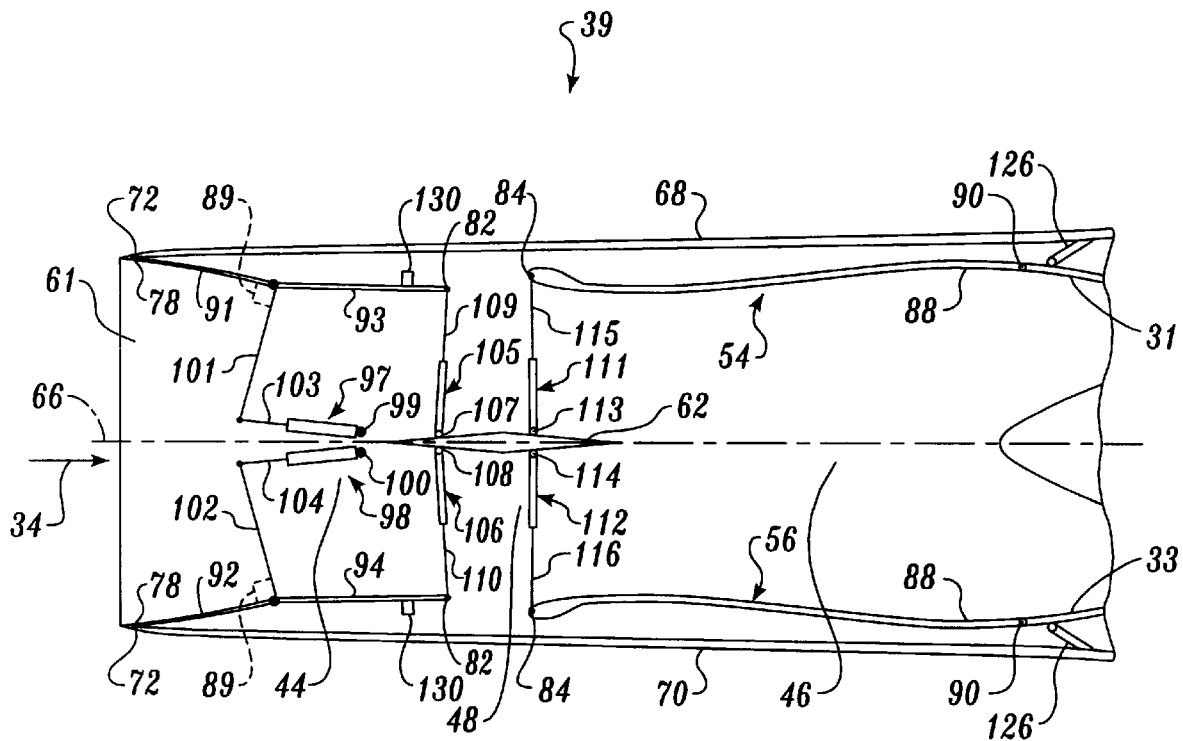
FIG. 3 is a schematic vertical axial section of a preferred embodiment of the internal compression engine inlet formed in accordance with the present invention, with components positioned to provide increased capture area for efficient take-off and landing performance.

A first configuration applicable to low speed flight (such as takeoffs and landings) is illustrated in FIG. 3. In this configuration the upper and lower forward ramps 50, 52 are caused to be positioned generally parallel to the inlet longitudinal axis 66, as are the upper and lower aft ramps 54, 56. The contraction ratio $^A/_A{}^*\approx 1$. It is preferable to include mechanisms to move the upper and lower forward ramp leading edges 78 away from each other to cause the leading edges 78 and cowl lips 72 to move apart in order to increase airflow capture area and reduce airflow losses during low-speed operation when the capture stream tube has a greater cross section than the inlet.

Figure 4:
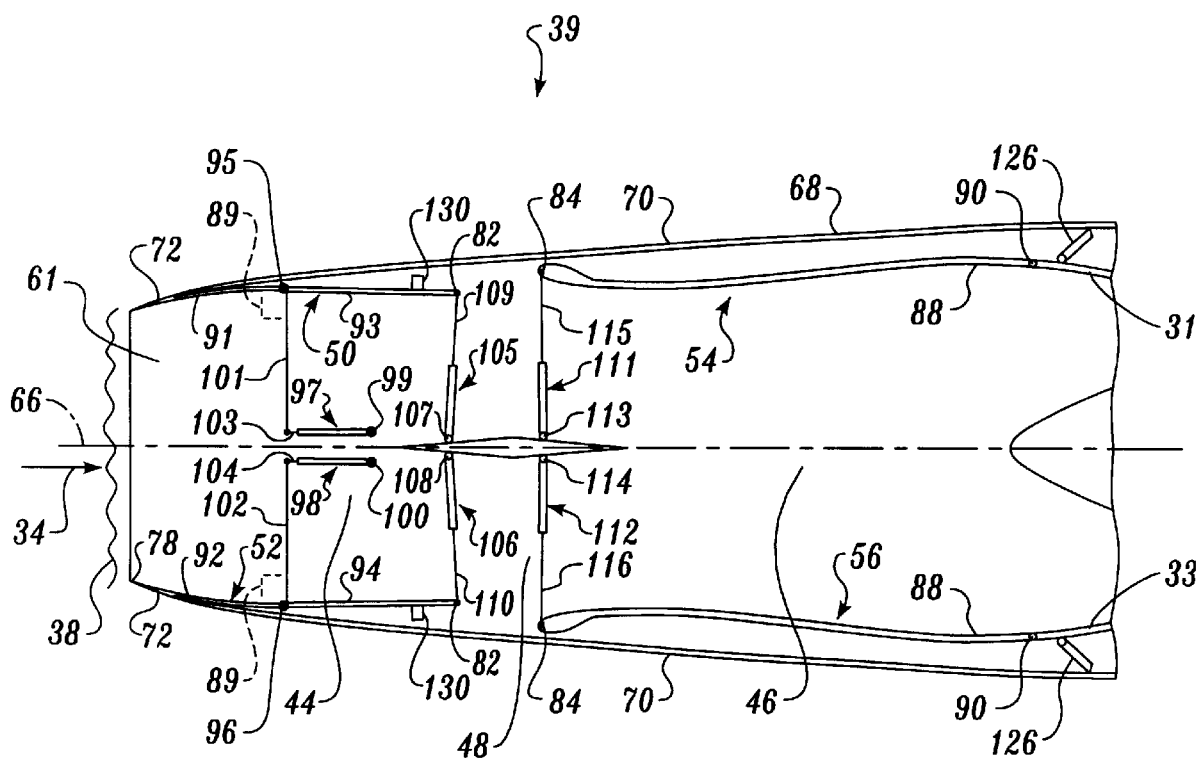
FIG. 4 is a schematic vertical axial section of a preferred embodiment of the inlet of FIG. 3 with components positioned for low drag subsonic and transonic (unstarted) flight.
Figure 6:
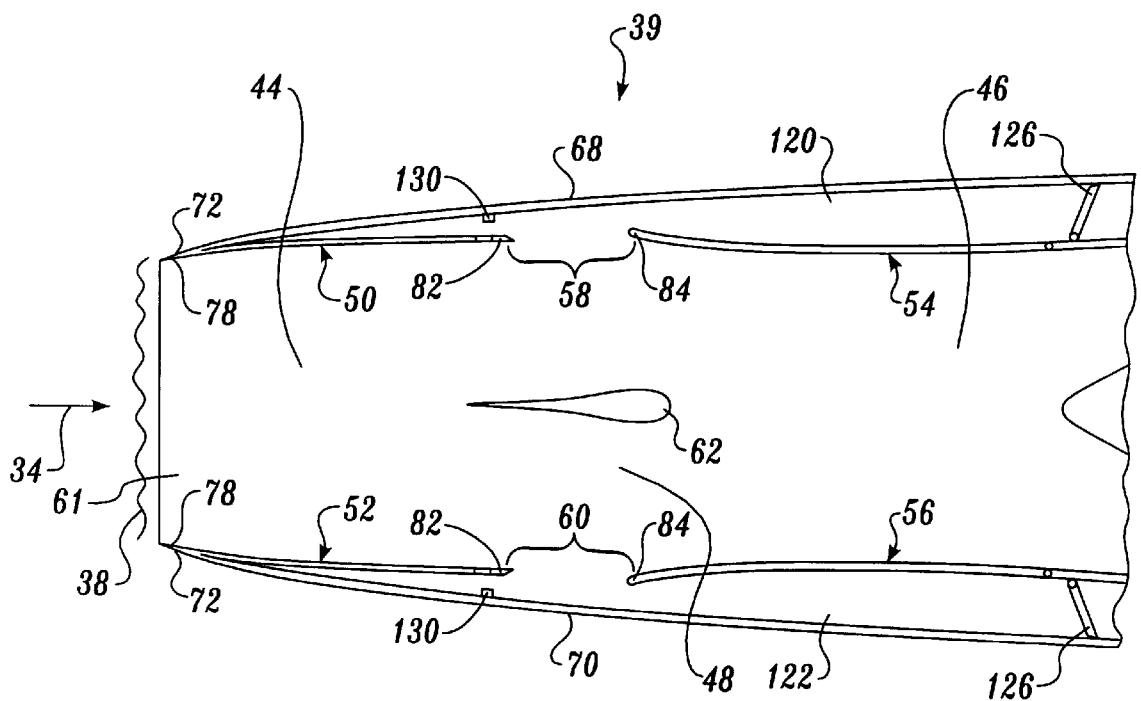
FIG. 6 is a schematic vertical axial section of the inlet of FIG. 2 with parts positioned for subsonic flight.

FIGS. 4 and 6 illustrate a second configuration, which is applicable to subsonic and transonic (unstarted) flight. This configuration is similar to the first configuration except the upper and lower forward ramp leading edges 78 and cowl lips 72 are moved toward each other to decrease the airflow capture area. This causes the external cowl surfaces of the upper and lower portions 68, 70 to assume a slightly convex shape near the cowl lips 72. This helps to efficiently spill airflow around the inlet in order to reduce spillage drag during subsonic and transonic flight.

Figure 7:
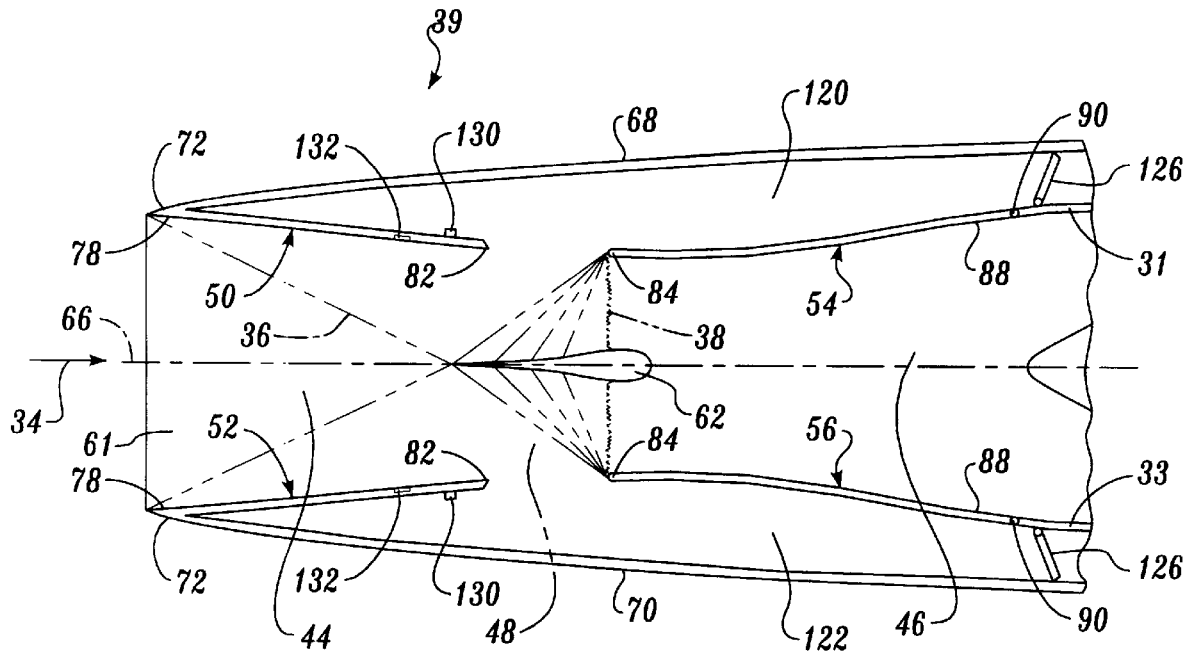
FIG. 7 is a schematic vertical axial section of the inlet of FIG. 2 with parts positioned for off-design speed (started) supersonic flight.

A third configuration applicable to supersonic off-design speed flight is illustrated in FIG. 7. The important characteristics of this configuration are a more streamline external cowl surface and an increase in contraction ratio. The external cowl surface is made streamlined by moving the upper and lower forward ramp ends 78 farther apart, causing the cowl lips 72 to move farther apart. As discussed in the Background, the inlet transitions from operating in spill mode to operating in full mode when transitioning from subsonic to supersonic flight. Commensurately, the leading edge of the inlet should transition from a blunt leading edge to a more streamlined leading edge. The contraction ratio is increased by moving the upper and lower forward ramp trailing ends 82 closer together, while simultaneously moving the upper and lower aft ramp leading ends 84 toward each other.

Figure 5:
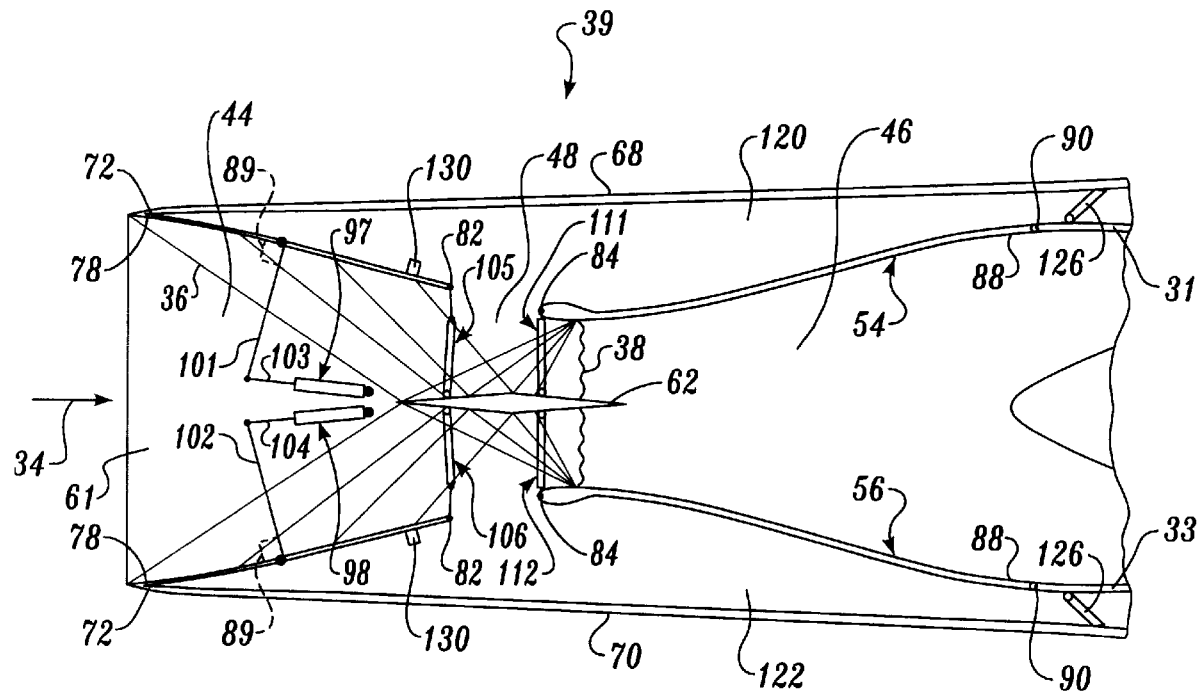
FIG. 5 is a schematic vertical axial section of the inlet of FIG. 3 with parts positioned for design speed (started) supersonic flight.
Figure 8:
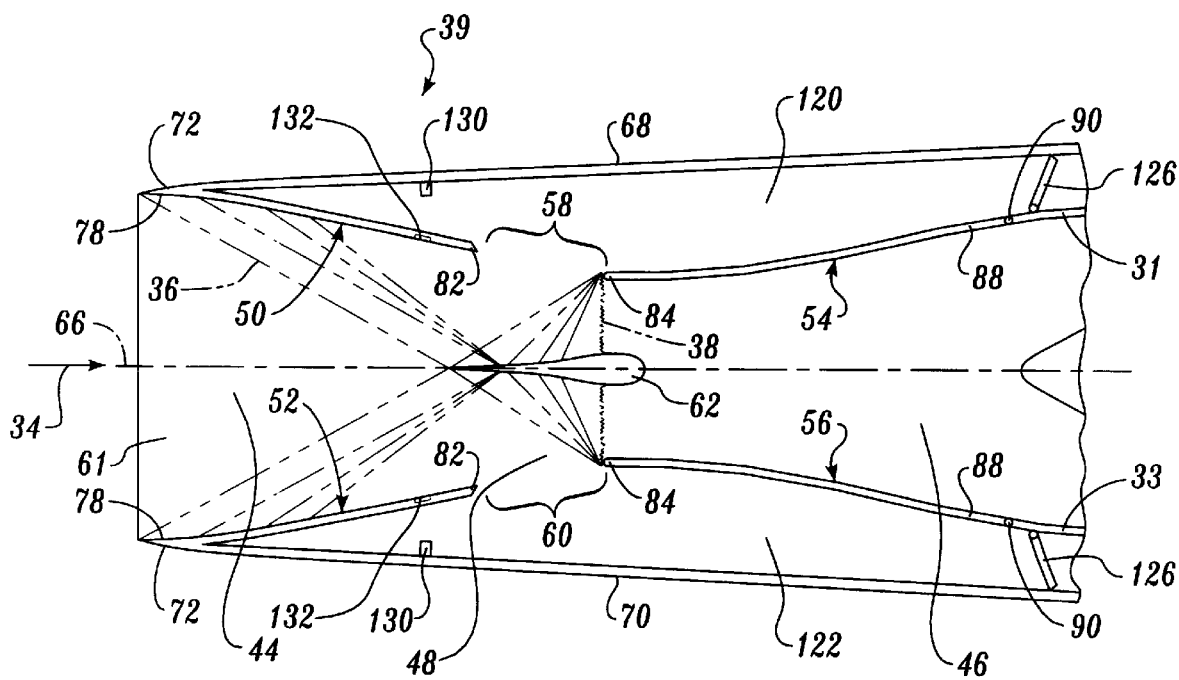
FIG. 8 is a schematic vertical axial section of the inlet of FIG. 2 with parts positioned for design speed (started) supersonic flight.

As the aircraft moves to its design speed, the inlet 39 transitions to a fourth configuration, illustrated in FIGS. 5 and 8. The fourth configuration is similar to the third configuration, except the contraction ratio is further increased and the upper and lower forward ramps 50, 52 are caused to assume a more concave curvature in order to provide optimal supersonic airflow compression.

FIGS. 3–5 show a preferred embodiment of the inlet 39 and a preferred embodiment of the mechanisms by which the forward and aft ramps 50, 52, 54, 56 are moved. In general, the mechanisms of FIGS. 3–5 are conventional fluid pressure cylinder actuators that extend or retract axial plungers to move links or other connecting components in order to change the position and shape of the ramps. The actuators are controlled by signals of the control system 150 according to a predefined logic. For most flight conditions, it is preferable that opposed ramps move in unison. Where independent ramp movements are desired, additional actuators and/or control logic may be added.

Referring to FIG. 3, the upper forward ramp includes two rigid, joined portions: a slightly concave leading portion 91, and a linear trailing portion 93. The lower forward ramp includes like portions 92, 94. The concave portions 91, 92 are each rigidly attached at their forward ends to a cowl lip 72, to form a relatively sharp edge. The concave portions 91, 92 are rotatably attached at their aft ends to the forward ends of the linear portions 93, 94 via hinges 95 and 96, respectively. The hinges 95, 96 extend between, and are rotatably attached to, the duct vertical sidewalls 61. The joined portions 91, 92, 93, 94 also extend between the vertical sidewalls 61.

A first pair of actuators is located in the supersonic diffuser 44 and are provided to cause movement of the concave portion 91 of the upper forward ramp 50. Shown in FIGS. 3–5 is one actuator 97 of the first pair of actuators, the one 97 being attached to the far vertical sidewall 61. A second pair of actuators is also available to cause movement of the concave portion 92 of the lower forward ramp 52. Shown in FIGS. 3–5 is one actuator 98 of the second pair of actuators, the one 98 also being attached to the far vertical sidewall 61. Each actuator of the first and second pair is positioned generally parallel to the inlet longitudinal axis 66. Each has a base end pivotably attached near mid-height to its adjacent vertical sidewall 61. In FIGS. 3–5, the base ends of actuators 97 and 98 are labeled 99 and 100, respectively.

Rod-like rigid links are rotatably connected at one end to the plungers of each actuator of the first and second actuator pairs. Shown in FIGS. 3–5 are links 101 and 102. Link 101 is rotatably connected at one end to plunger 103 of actuator 97. Link 102 is rotatably connected at one end to plunger 104 of actuator 98. The rigid links maintain a constant shape and length at all times. The opposed rigid link ends are rotatably attached to the hinges 95, 96 connecting the concave portions 91, 92 with the linear portions 93, 94. As shown in FIGS. 3–5, link 101 is attached to hinge 95 near the connection of hinge 95 to the far vertical sidewall 61. Likewise, link 102 is attached to hinge 96 near the connection of hinge 96 to the far vertical sidewall 61.

All link attachments to the hinges 95, 96 at both the far and near vertical sidewalls, are additionally connected to their respective concave portions 91, 92 such that a constant angle is maintained between the links and the concave portions. This is indicated in FIGS. 3–5 by an orthogonal symbol 89, shown in phantom. The preferred angle is approximately 90 degrees, although other angles may be used for other actuator arrangements.

When the plungers of the actuators in the first and second actuator pairs are extended, the rigid links rotate about their end connection to the hinges 95, 96 in a fashion sometimes called a bell-crank arrangement. Because the concave portions 91, 92 are not attached to the vertical sidewalls and because the rigid links are maintained at a constant angle relative to the concave portions, rotation of the links causes a like rotation of the concave portions 91, 92, also about the hinges 95, 96. Rotating the concave portions 91, 92 about the hinges 95, 96 provides a way to manipulate the size of the intake area and a way to alter the angle of attack of the cowl lips relative to the approaching free stream airflow. Additionally, extension of the plungers can alter the amount of convergence available in the supersonic diffuser, since widening the intake area causes the concave portion to converge in the direction of airflow.

Still referring to FIGS. 3–5, a third pair of actuators are rotatably attached to opposed vertical sidewalls 61 and are used to control movement of the upper forward ramp trailing ends 82. The actuators are generally vertically oriented with their plungers rotatably attached to the upper forward ramp trailing end 82 (which is also the aft end of the upper forward ramp linear portion 93 of FIGS. 3–5). Shown in FIGS. 3–5 is one actuator 105 of the third actuator pair, the one 105 being attached to the far vertical sidewall 61. The lower forward ramp trailing edge is configured in a like manner to a fourth pair of actuators. In FIGS. 3–5, one actuator 106 of the fourth actuator pair is shown, the one 106 being attached to the far vertical sidewall 61.

Each actuator of the third and fourth actuator pairs has a base end pivotably attached near mid-height to its adjacent vertical sidewall. In FIGS. 3–5, the base ends of the actuators 105 and 106 are labeled 107 and 108, respectively. These base ends 107, 108 are rotatably attached to the far vertical sidewall 61 at a location near the optional splitter 62.

The plungers of the third and fourth actuator pairs are rotatably attached to the trailing ends 82 of the upper and lower forward ramps 50, 52 (which is also the aft end of the linear portions 93, 94) at the vertical sidewalls 61. In FIGS. 3–5, plunger 109 extends from actuators 105 to rotatably connect to the trailing end 82 of the upper forward ramp 50, while plunger 110 extends from actuator 106 to rotatably connect to the trailing end 82 of the lower forward ramp 52. Unlike the angle between the first and second actuator pair linkages with the concave portions, the angle between the third and fourth actuator pair plungers and the linear portions 93, 94 is unrestricted. Extension of the third and fourth actuator pair plungers causes the upper and lower forward ramp trailing ends 82 to move apart as the linear portions 93, 94 rotate about the hinges 95, 96. Retraction causes the opposite movement. The third and fourth actuator pairs therefore provide a method of manipulating the amount of convergence available in the supersonic diffuser, since moving the trailing ends 82 of the forward ramps 50, 52 together causes the linear portions to converge in the direction of airflow 34.

As shown in FIG. 3, the upper and lower aft ramps 54, 56 include a single slightly convex curved surface having a trailing end that is connected via rotatable connections 90 to the downstream inlet duct walls 31, 33 near the face of the engine. Either the downstream inlet duct walls 31, 33 or the rotatable connections 90 are fixedly attached to the vertical sidewalls 61 so that the trailing ends 88 of the aft ramps are held at one location. The preferred aft ramps 54, 56 are of a single surface as opposed to a series of joined sub-surfaces, since rotation of the aft ramps about their rotatable connections 90 is done to control the amount of subsonic diffuser divergence which should optimally affect the entire length of the aft ramps.

Still referring to FIG. 3, a fifth pair of actuators are rotatably attached to opposed vertical sidewalls 61, downstream of the third pair of actuators. The actuators are generally vertically oriented with their plungers rotatably attached to the upper aft ramp leading end 84. Shown in FIGS. 3–5 is one actuator 111 of the third actuator pair, the one 111 being attached to the far vertical sidewall 61. The lower aft ramp leading end is configured in a like manner to a sixth pair of actuators. Shown in FIGS. 3–5 is one actuator 112 of the sixth actuator pair, the one 112 being attached to the far vertical sidewall 61. The fifth and sixth actuator pairs operate to control the movement and position of the leading ends of the aft ramps 54, 56.

Each actuator of the fifth and sixth actuator pairs has a base end pivotably attached near mid-height to its adjacent vertical sidewall. In FIGS. 3–5, the base ends of the actuators 111 and 112 are labeled 113 and 114, respectively. These base ends 113, 114 are rotatably attached to the far vertical sidewall 61 at a location near the optional splitter 62.

The plungers of the fifth and sixth actuator pairs are rotatably attached to the leading ends 84 of the upper and lower aft ramps 54, 56 at the vertical sidewalls 61. In FIGS. 3–5, plunger 115 extends from actuators 111 to rotatably connect to the leading end 84 of the upper aft ramp 54, while plunger 116 extends from actuator 112 to rotatably connect to the leading end 84 of the lower aft ramp 56. The angle between the fifth and sixth actuator pair plungers and the aft ramps 54, 56 is unrestricted. Extension of the fifth and sixth actuator pair plungers causes the upper and lower aft ramp leading ends 84 to move apart as the aft ramps rotate about their hinge connections 90 at the downstream duct walls 31, 33, respectively. Retraction causes the opposite movement. As with the actuators of the third and fourth actuator pairs, the fifth and sixth actuator pairs may rotate slightly about their connection to the sidewalls during movement of their plungers. The fifth and sixth actuator pairs provide a method of manipulating the amount of divergence available in the subsonic diffuser 46, since mnoving the leading ends 84 of the aft ramps 54, 56 causes the aft ramps to diverge in the direction of airflow 34.

As will be appreciated by those skilled in the art, the configuration described above provides a wide variety of useful duct shapes. Especially important is the ability to vary the cross-sectional area of the throat region 48 by changing the positions of the forward ramp trailing ends and the aft ramp leading ends. Although a variable throat size is not necessary for normal supersonic operations, it does increase the aerodynamic efficiency of the inlet over a wide range of speeds and provides a mechanism by which an engine may be restarted during supersonic flight. Also important is the ability of the above configuration to alter the height of the intake aperture and the curvature of the cowl, thereby allowing the present invention inlet to efficiently spill airflow during subsonic flight.

The configuration described with reference to FIGS. 3–5 is intended to be exemplary and not limiting. Although the embodiment described above herein includes two sets of actuators at each station (yielding a preferable doubly redundant system), the present invention may be practiced by actuating the ramps from only one side, thereby reducing the required actuator count by one half.

Referring to FIGS. 7 and 8, the splitter 62 aids in airflow compression by spreading supersonic compression over a longer surface (the sum of the forward ramp and splitter surfaces) thereby reducing the adverse pressure gradients and associated shock losses. The splitter allows the shock waves to be weaker while still achieving the desired amount of flow turning. The splitter 62 is generally a slightly curved, horizontal member preferably having suitably ramped outer side surfaces to direct the airflow. The splitter 62 may be formed of any appropriate material, such as aluminum, stainless steel, titanium, composites, etc., depending on the design flight Mach number and in particular the anticipated operating temperature.

The splitter 62 is vertically centered in the duct throat region 48 between the first and second slots 58, 60, with the splitter's longitudinal axis generally coextensive with the inlet longitudinal axis 66. The splitter length is longer than the slot lengths, regardless of the position of the forward and aft ramps 50, 52, 54, 56. The splitter 62 is positioned relative to the first and second slots 58, 60 such that at all times imaginary lines connecting the forward ramp trailing ends 82 and the aft ramp leading ends 84 would intersect a portion of the splitter 62.

The splitter 62 can be attached to the duct using conventional methods. In FIGS. 2–10, the splitter 62 extends between, and is welded to, the vertical sidewalls 61 of the duct. The splitter 62 described and shown herein is completely stationary. Alternatively, the splitter can be made to translate, or can include side surfaces that are alterable in surface shape, in order to focus the airflow to effect a particular result.

Referring to FIG. 2, the first and second slots 58, 60 of the throat region 48 are defined by the forward ramp trailing ends 82 and the aft ramp leading ends 84. The first slot 58 opens to an upper shock trap plenum 120; the second slot 60 opens to a lower shock trap plenum 122. The slots 58, 60 provide a passage through which air may be drawn from the duct, to aid in starting and/or restarting the engine and in maintaining the location of the normal shock 38 within the throat region 48.

Because the slots are defined in part by the position of the forward and aft ramps, as the ramp positions change, the size of the slot also changes. The width of the slot is a function of the details of the supersonic diffluser design and of the bypass capacity needed to provide the desired level of flow stability, including resistance to unstart. It is not necessary that the slot size be variable to provide the stable operation of an internal compression inlet according to the present invention. Should this aspect become important for a particular application, the slot sizes may be further manipulated by the addition of translatable forward and aft ramp portions using additional known mechanisms.

Each plenum 120, 122 includes a vent 124 that opens either overboard of the engine to the ambient air or to a low pressure volume within the propulsion system. The cross-sectional flow-through area of the vent is determined by the position of a vent door 126. Care should be taken to ensure that the vent opening 124 is sized sufficiently large to exhaust necessary amounts of air during all anticipated flight conditions. The position of each vent door 126 is controlled by a door actuator 127 (shown diagrammatically in FIG. 2) which operates according to output commands from the control system 150. For less sophisticated systems, other mechanisms may be used to control the vent door positions (e.g., a simple spring).

Figure 9:
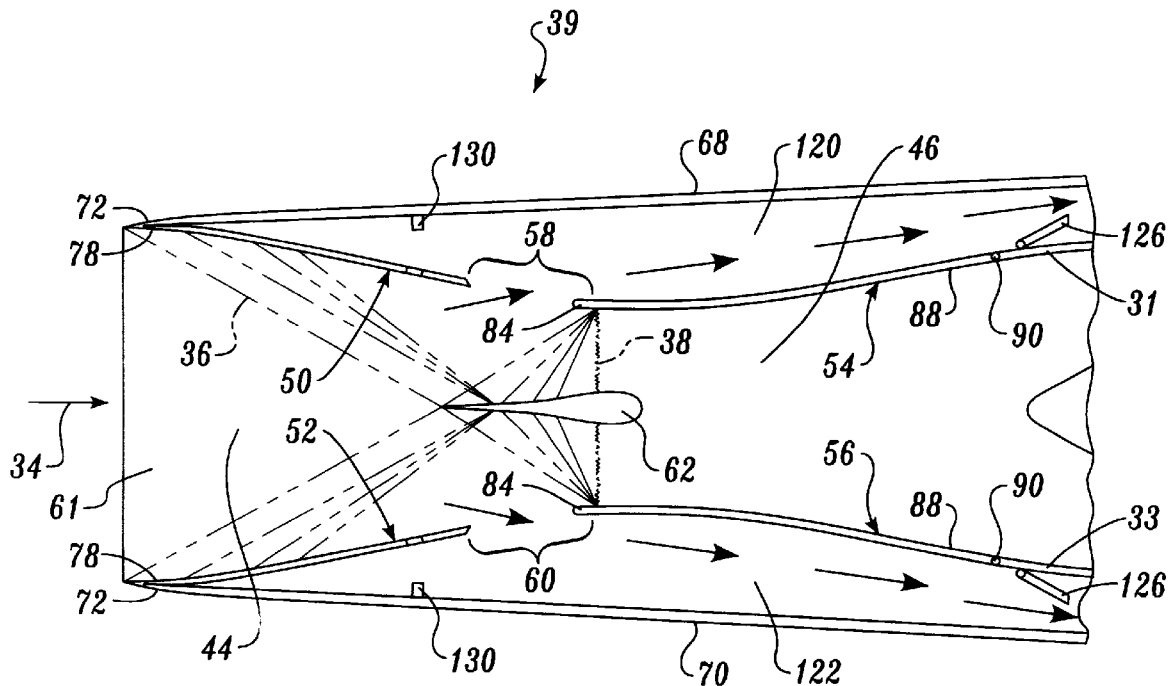
FIG. 9 is a schematic vertical axial section of the inlet of FIG. 2 showing the present invention response during supersonic flight to a decrease in pressure in the supersonic diffuser.
Figure 10:
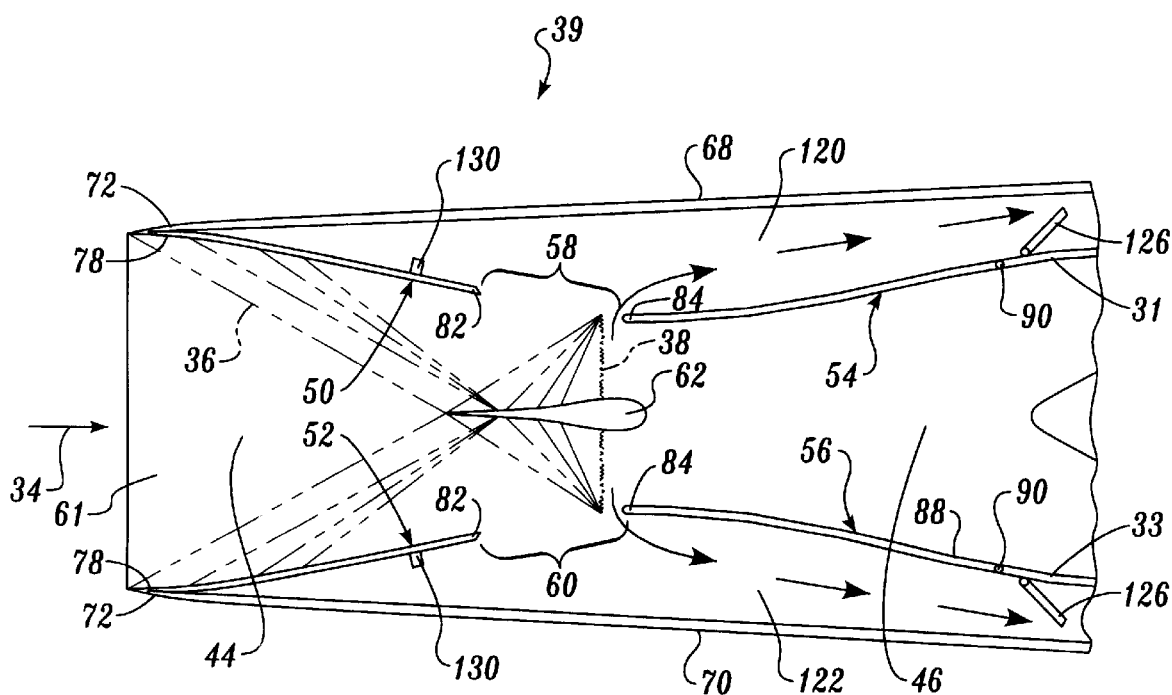
FIG. 10 is a schematic vertical axial section of the inlet of FIG. 2 showing supersonic flight passing flow from the subsonic diffuser through the throat slot to prevent unstart.

Each vent door 126 may be completely closed, sealing the plenum as shown in FIGS. 2–8, or may be opened a selected amount as shown in FIGS. 9 and 10. The preferred vent door 126 is rotatable about one end so as to offer a continuum of airflow passage amounts. The vent doors 126 are optimally operated in unison to take up like positions. If a more complex operating system is required by a particular application, the vent doors 126 may be operated independently by adding the requisite control logic to the control system 150.

A precision vent 128 for venting small and exact quantities of air from each plenum 120, 122 is provided to fine tune the pressure in each plenum 120, 122 to a desired value. The precision vent 128 is preferably located within the vent door 126, as shown in FIG. 2. The precision vent 128 should have a rapid response time and the capability to exhaust exact small quantities. One such device is a fluidic device as shown in U.S. Pat. No. 3,643,676 to Limage et al., incorporated herein by reference. A fluidic vent is desirable because it has no mechanically moving parts, it is exactly controllable, and it has a very rapid response time.

As will be appreciated by those skilled in the art, the vent doors 126 provide a coarse adjustment to maintain plenum air pressures, while the precision vents 128 provide a fine adjustment. The inlet will operate according to the present invention without the precision vent; however, use of such a vent increases the efficiency of the inlet and the amount of control available to optimize airflow.

Each plenum 120, 122 further includes one or more static air pressure sensors 130. The plenum static air pressure sensors 130 may be located on the cowl side of the forward ramps as shown in FIGS. 3–5, 7 and 10, on the wall of the plenum as shown in FIGS. 2, 6, 8, and 9, or at any other suitable location. The plenum pressure sensors 130 sense static air pressure in the plenums and input the data to the control system 150. One or more supersonic diffuser static air pressure sensors 132 are provided along the aft portion of the upper and/or lower forward ramp faces 80. It is preferable that the supersonic diffuser sensors 132 be embedded within the ramp faces 80 to avoid disrupting the airflow. The supersonic static air pressure sensors 132 sense the static air pressure in the supersonic diffiser 44 and pass the data to the control system 150. The control system 150 uses the data along with the plenum static air pressure data to compute the amount of air in the plenums that should be expelled and to output a position command to the actuators of vent doors 126 and 128 in order to expel that amount of air.

In this manner, the control system ensures that the static pressure in the supersonic diffuser in the vicinity of the throat slot is approximately equal to the static pressure within the plenum. It is desirable to equalize these pressures in order to maintain smooth airflow across the first and second slots 58, 60 to cause the slots to act as "virtual" top and bottom duct walls.

In the event the pressure in the plenums 120 and/or 122 is above that on the aft portion of the forward ramps 50, 52, the vent doors 126 and/or precision vents 128 are opened to permit some of the air in the plenums to exhaust air to the atmosphere, thus lowering the plenums' air pressure. The vent doors 126, 128 may be held open a predetermined amount at all times to maintain the selected pressure in the plenums if necessary, depending on flight conditions.

The control system 150 is illustrated in FIG. 11 and includes a central processing unit 152, such as provided by a computer. Various components may be used to provide input data to this system, depending on the level of sophistication required in a particular application. Example sources are the plenum static air pressure sensors 130, the forward ramp static air pressure sensors 132, aircraft performance data sensors 136, and other aircraft data sources 138 (e.g., light radar). The precise types of input information will depend on factors known to those skilled in the art. Typical data includes actuator positions, duct static air pressures, plenum static air pressures, aircraft speed, aircraft altitude, etc.

The control system processing unit 152 computes the optimal inlet configuration according to its predefined logic and outputs control commands to effect the inlet accordingly. Typical output data includes individual position commands to all ramp actuators 158, all vent actuators 160, and general inlet status information to other flight systems 162 (e.g., a flight management computer system).

The control system 150 preferably includes a display unit 154, either as a stand alone panel or as part of a larger cockpit display. The display unit 154 includes the ability to accept pilot inputs in addition to the display of inlet data. Many other sensors and control components are available for inclusion in the control system of the present invention, their appropriate use being well known to those skilled in the art.

Described below are five modes of operation for the present invention, the first four of which correlate with the four operating configurations discussed above. These five modes are: takeoff and landing low speed flight, subsonic and transonic (unstarted) flight, off-design started flight, design flight, and design flight during flow disturbance. In general, free stream air enters the inlet duct at the inlet intake aperture, and after being slowed to a desired speed by the diffusers, the air enters the engine at its face.

Operation and performance of the present invention with regard to low speed (takeoff and landing) flight is discussed with reference to FIG. 3. During low speed flight it is desirable to kept the inlet passage walls generally parallel such that the contraction ratio is roughly equal to one. Moving the upper and lower forward ramp leading edges and cowl lips away from each other will increase the airflow capture area and reduce airflow losses during low-speed operation when the capture stream tube has a greater cross section than the inlet. As a side benefit, the ability to increase the throat area to very large values relative to the inlet intake aperture allows for the reduction of the size, or possible elimination, of auxiliary inlets during takeoff operation for some types of supersonic aircraft.

Operation and performance of the present invention with regard to subsonic and transonic (unstarted) flight is discussed with reference to FIGS. 4 and 6. During subsonic flight conditions, there is no need to alter the geometry of the inlet. Changes in engine airflow demand can propagate forward through the subsonic stream smoothly and excess air can be spilled without shock losses. Efficient matching of the inlet and engine happens automatically, without external control. The inlet assumes the second operating configuration as described above where the ramp positions form a duct shape that has very little cross-sectional divergence or convergence. The second inlet operating configuration also includes positioning the forward ramp leading ends 82 and cowl lips 72 closer together in order to form a convex curve to the forward external cowl shape, allowing airflow to efficiently spill around the inlet.

Depending on the amount of airflow capable of being consumed by the engine, the vent doors 126 may be positioned open to bypass any excess airflow. As represented in FIGS. 4 and 6, during subsonic flight, no shock waves internal to the inlet are yet present. The pressure in the plenums 120, 122 may be regulated by the control system 150 to selectively siphon air from the supersonic diffuser, since whether the first and second slots 58, 60 appear as smooth walls to air flowing through the duct is irrelevant.

Operation and performance of the present invention during transonic flight (i.e., flight performed near the speed of sound, Mach 1) is discussed with reference to FIGS. 4 and 6. As the aircraft's speed increases, the inlet approaches the transonic drag rise condition—a condition in which a rapid increase in spillage drag occurs caused by the formation of strong shock waves as the excess air makes sharp turns around the cowl. The ambient air becomes "aware" of the presence of the inlet too late because the flight speed is close to the propagation speed of small disturbances (i.e., the speed of sound).

When the aircraft's speed approaches the speed of sound, a normal shock wave is generated external to the inlet 39 at the cowl lips 72, as represented by line 38 in FIGS. 4 and 6. As the flight speed increases, the external normal shock raises the drag to unacceptable levels and the inlet must be started. Starting the inlet refers to moving the normal shock from outside the cowl lips 72 into the throat region 48 of the duct. The inlet 39 is started by increasing the contraction ratio by decreasing the throat area and by simultaneously opening the plenum vent doors 126. This causes the air pressure in. the plenums 120, 122 to decrease as airflow downstream of the shock exits through the vents 126 via the slots 58, 60. The drop in air pressure causes the normal shock 38 to enter the duct and move quickly to the throat region 48.

As defined above, the throat region includes the first and second slots 58, 60. During this transition period, the normal shock wave 38 is positioned at the slots 58, 60. At this point, the normal shock wave is said to reside at the aerodynamic throat, that is the position where the streamlines converge to the minimum flow area, as opposed to the geometric throat (the position of smallest cross-sectional duct area). Continuing to keep the vent doors 126 open encourages the normal shock to move further along the throat and prevents it from moving forward. Within a short period of time, the normal shock moves aft to just past the geometric throat, near the aft ramp leading ends 84. Even if the normal shock is held at the slots 58, 60 for more than a brief period, the normal shock wave is still aerodynamically in a diverging flow. Stable operation of the inlet 39 will be maintained and the inlet will not unstart. Normally, though, the normal shock wave is located at the slots for only a very short period of time. Once the normal shock wave stabilizes at the aft ramp forward ends, the inlet is said to be started. Once the inlet is started, the plenum vent doors 126 may be completely or partially closed as required.

Operation and performance of the present invention during off-design started flight (i.e., supersonic speeds lower than design cruise speeds) is discussed with reference to FIG. 7, where the inlet 39 assumes the third operating configuration discussed in detail above. Just prior to starting the inlet, the contraction ratio is increased by reducing the throat area, which is accomplished by moving the forward ramp trailing ends 82 closer together and the aft ramp leading ends 84 closer together. The required curvature of the forward ramps to turn the flow is less than that required at the design cruise condition, since less compression is required to achieve the desired throat Mach number. As is understood by those skilled in the art, increased forward ramp curvature results in increased compression of the airflow in the supersonic diffuser, and hence reduced local airflow speed. Depending on the airflow schedule versus flight Mach number of the engine, the inlet intake height may be changed as appropriate, concurrent with the change in the forward ramp curvatures.

Still referring to FIG. 7, various oblique shock waves 36 begin to form off the cowl lips 72 as the supersonic speed of the aircraft increases. These oblique shock waves 36 represent speed decreases occurring in the airflow of the supersonic diffuser 44 as the air is compressed between the forward ramps 50, 52 and the splitter 62.

Operation and performance of the present invention during the design speed flight is discussed with regard to FIGS. 5 and 8, where the inlet 39 assumes the fourth operating configuration as discussed in detail above. During the time the aircraft transitions from off-design supersonic flight speeds to design supersonic flight speeds, the configuration of the convex curvature of the forward ramps 50, 52 is increased to accommodate the increased compression needed to maintain the local speed of the airflow just upstream of the normal shock at its optimum value. If a splitter 62 is used, the efficiency of the compression occurring in the supersonic diffuser is increased due to the reduction in the flow turning requirements on the forward ramps 50, 52. The cowl lips 72 may be moved yet farther apart to increase the intake height and decrease the curvature of the external cowl surfaces 68, 70. The resulting cowl configuration causes the cowl to have a streamlined external shape and low angle of attack relative to the free stream airflow, thus advantageously lowering the inlet's wave drag.

During normal design flight, the air pressures in the plenums 120, 122 are maintained at an amount approximately equal to the pressure at the forward ramp trailing ends 82. Maintaining the pressure in the plenums 120, 122 as such causes the airflow in the duct to pass smoothly across the first and second slots 58, 60, as though the slots 58, 60 were solid top and bottom duct walls. The vent doors 126 and precision vents 128 are opened or closed as needed to maintain this desired pressure equilibrium.

Operation and performance of the present invention during flow disturbances is discussed with regard to FIGS. 9 and 10. The system response described below is applicable for both the design and off-design supersonic flight conditions. In general, four types of flow disturbances are possible: 1) a decrease in air pressure in the supersonic diffuser; 2) a decrease in air pressure in the subsonic diffuser; 3) an increase in air pressure in the supersonic diffuser; or 4) an increase in air pressure in the subsonic diffuser. A variety of natural and artificial circumstances are known to cause these types of disturbances, such as thermal updrafts, certain aircraft maneuvers, and inadvertent changes in engine corrected air flow.

In the event that supersonic diffuser static air pressure decreases, the drop in pressure is sensed by the forward ramp sensors 132 and the control system 150 causes the pressure in the plenums to decrease by opening the plenum vent doors 126 and/or 128, thereby permitting air to exhaust out the plenums 120, 122 until the static air pressures are at the desired level. Siphoning off of airflow is shown in FIG. 9. In this regard, the vents are used to maintain equal pressure between the supersonic diffuser and the plenums so that the first and second slots 58, 60 continue to act as duct walls. The slots are never allowed to back draft air from the plenums into the duct, but only to provide controlled suction of air from the duct into the plenums 120, 122. Decreased pressure in the supersonic diffuser means the airflow is moving faster and as a result, the normal shock 38 will tend to move downstream. Such downstream movement of the normal shock is acceptable, within limits.

In the event that subsonic diffuser air pressure decreases, the normal shock will move downstream and reach a stable position. After the disturbance raises, the normal shock will return to its design position. Supersonic inlets, in general, are tolerant to this type of disturbance.

In the event that the inlet experiences an increase in the static air pressure in the supersonic diffuser 44, a corresponding increase in static air pressure occurs in the plenums 120, 122. Increased pressure in the supersonic diffuser means the airflow is moving slower and as a result, the normal shock 38 will tend to move upstream into the region of the slots. The control system 150 actively senses these pressure increases and adjusts the vent doors 126, 128 to allow airflow to pass from the plenums, thus relieving the pressure in the supersonic diffuser as well. If the normal shock is located within the slots, then air will also siphon out the slots aft of the normal shock wave from the subsonic diffuser. This is illustrated in FIG. 10. Siphoning air from the supersonic diffuser reduces supersonic diffuser pressure encouraging the normal shock to move downstream, while siphoning air from the subsonic diffuser also reduces pressure in the subsonic diffuser which further encourages the normal shock to move downstream.

In the event that subsonic diffuser air pressure increases, the increased pressure will tend to force the normal shock wave 38 forward of the aft ramp leading ends 82 into the slot region, as shown in FIG. 10. Because subsonic airflow pressure is generally greater than plenum air pressure, subsonic airflow aft of the normal shock will enter the plenums through the slots aft of the normal shock. As the air pressure within the plenums increases, the vent doors 126, 128 are opened to permit air to exit through the vent openings 124 to maintain the static air pressure within the plenum equal to the static air pressure in the supersonic diffuser 44. A fast response time of the vent doors 126 can quickly reduce excess air pressure in the subsonic diffuser 46 and move the normal shock 38 back to its optimum position at the aft ramp leading ends 84, thus preventing an inlet unstart. When the flow disturbance passes and the various air pressures are dissipated, the need for airflow venting disappears, and the control system 150 closes the vent doors 126, 128 to their nominal operating positions. As will be appreciated by those skilled in the art, the slots 58, 60 provide the inlet 39 with exceptional flow stability.

If a sudden change in flight conditions was merely transient, the normal shock wave 38 will move to the slots, but will quickly return to its correct position within the duct due to the fast response of the control system 150 in adjusting the vents doors 126 or 128. The forward and aft ramps 50, 52, 54, 56 will remain in their same positions. However, if the change in flight conditions lasts longer, the control system 150 causes the position of the forward and aft ramps 50, 52, 54, 56 to change over the next few seconds to provide the most aerodynamically efficient inlet operating configuration for the new flight condition, with a potentially different air pressure being maintained in the plenums 120, 122 based on the new circumstances.

Should a sudden change in flight conditions instantaneously unstart the engine during supersonic flight, the contraction ratio necessary to restart the engine can be easily reached by decreasing the intake height by moving the forward ramp leading ends closer together, while at the same time increasing the throat area by moving the forward ramp trailing ends 82 and aft ramp leading ends 84 farther apart. Next, the vent doors 126 are opened to cause the static air pressure in the plenums 120, 122 to drop as air exits through the vent openings 124. The low air pressure in the plenums causes low air pressure in the supersonic diffuser which draws the normal shock quickly from the inlet intake aperture into the duct throat 48. After the normal shock 38 has entered the duct, the vent openings 126 are decreased to increase the pressure in the plenums 120, 122 and move the normal shock to its most stable operating position near the aft ramp leading ends 84.

In various circumstances, the vent doors 126 may also be used to bypass excess air captured by the inlet 39 in order to improve engine aerodynamic efficiency. To bypass air, the static air pressure in the plenums 120, 122 is decreased by opening the vent doors 126 to expel the excess air. The normal shock wave may move to within the slots 58, 60, permitting some subsonic air to exit as bypass air as well. As stated above, this arrangement is still stable and can be present without adverse engine performance affects.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of providing air to a supersonic aircraft engine through a supersonic internal compression inlet duct, the method comprising:

(a) channeling air into the duct during flight, the duct including a supersonic diffuser, a subsonic diffuser positioned aft of the supersonic diffuser, and a throat region positioned generally between the supersonic diffuser and the subsonic diffuser; the throat region including at least one slot, the at least one slot opening into a plenum chamber having a vent in communication with a low pressure volume;

(b) sensing the static air pressure in the supersonic diffuser;

(c) sensing the static air pressure in the plenum;

(d) comparing the static air pressure in the supersonic diffuser with the static air pressure in the plenum; and (e) selectively exhausting air from the plenum via the vent in order to maintain the plenum static air pressure at a select value, such that during started flight, supersonic compression occurs entirely within the supersonic diffuser and increases in air pressure in the subsonic diffuser may be relieved through the throat region slot to the low pressure volume.

2. The method according to claim 1, wherein the exhausting of air from the plenum is accomplished in order to maintain the plenum static air pressure at a value approximately equal to the static air pressure in the supersonic diffuser.

3. The method according to claim 1, further including the steps of sensing the current inlet and flight condition, of computing the optimum supersonic and subsonic diffuser cross-sectional shapes, and of varying the supersonic and the subsonic diffusers cross-sectional shapes to match the computed optimum shapes.

4. The method according to claim 3, wherein the forward end of the supersonic diffuser defines an inlet aperture area; and wherein during unstarted flight, starting of the inlet is initiated by arranging the supersonic and subsonic diffusers so that their cross-sectional shapes result in a ratio of inlet aperture area to throat area having a value equal to or less than the maximum starting ratio required to start the inlet.

5. The method according to claim 4, wherein starting of the inlet is further encouraged by reducing air pressure within the inlet by passing inlet air out the slot to the low pressure volume.

6. The method according to claim 1, wherein selectively exhausting air from the plenum is accomplished by an electronic control system; the control system receiving the sensed static air pressure in the supersonic diffuser and the sensed the static air pressure in the plenum the control system further comparing the sensed pressures and providing a position command signal to a vent door opening mechanism according to a predefined logic.

7. The method according to claim 6, wherein the electronic control system further provides position command signals to a supersonic diffuser mechanism to vary the cross-sectional size of the supersonic diffuser and provides position command signals to a subsonic diffuser mechanism to vary the cross-sectional size of the subsonic diffuser.

* * * * *

UNITED STATES PATENT AND TRADEMARK OFFICE
CERTIFICATE OF CORRECTION

PATENT NO. : 5,971,000
DATED : October 26, 1999
INVENTOR(S) : Konesek et al.

It is certified that error appears in the above-identified patent and that said Letters Patent is hereby corrected as shown below:

Title page,
Item [56] Referenced Cited: Item #9, should read -- 4,641,678 --.

Column 18,
Line 50, after "plenum" insert -- ; --.
Line 50, delete the first occurrence of "the".

Signed and Sealed this

Ninth Day of October, 2001

Attest:

NICHOLAS P. GODICI
Attesting Officer  Acting Director of the United States Patent and Trademark Office

UNITED STATES PATENT AND TRADEMARK OFFICE
CERTIFICATE OF CORRECTION

PATENT NO. : 5,971,000
DATED : October 26, 1999
INVENTOR(S) : Koncsek et al.

It is certified that error appears in the above-identified patent and that said Letters Patent is hereby corrected as shown below:

Title page,
Item [56], References Cited,
Line 9, should read -- 4,641,678 --.

Column 18,
Line 50, after "plenum" insert -- ; --, and delete the first occurrence of "the".

This certificate supersedes Certificate of Correction issued October 9, 2001

Signed and Sealed this

Nineteenth Day of February, 2002

Attest:

JAMES E. ROGAN
Attesting Officer         Director of the United States Patent and Trademark Office